July 2, 1968     S. M. DOCKERTY     3,390,505

REFRACTORY HOUSING

Filed Nov. 28, 1966

*INVENTOR.*
STUART M. DOCKERTY

BY *Berton R. Turner*

ATTORNEY

United States Patent Office 3,390,505
Patented July 2, 1968

3,390,505
REFRACTORY HOUSING
Stuart M. Dockery, Corning, N.Y., assignor to Corning Glass Works, Corning, N.Y., a corporation of New York
Filed Nov. 28, 1966, Ser. No. 597,341
8 Claims. (Cl. 52—596)

ABSTRACT OF THE DISCLOSURE

The invention comprises an improved metallic housing or enclosure for housing individual blocks of refractory insulation, such as may be utilized to thermally insulate a hot glass operation. A sidewall structure of thin metal foil and expanded metal not only protects the hot glass against contamination by spalling and dusting of the refractory block, but also provides for a more uniform heat distribution across the inner face of the enclosure by materially reducing the amount of heat conducted along the sidewalls thereof to the outside face, from that normally conducted by known or conventional enclosures.

---

In the manufacture of glass articles it is desirable to enclose refractory material utilized to insulate hot glass operations, such as performed in an annealing lehr, forming muffle, delivery area, etc., in order to avoid glass contamination by spalling or dusting of the refractory. It is also expedient to encase refractory block in metal enclosures in those installations where numerous blocks must necessarily be removed, such as clean out doors, maintenance doors, etc., in lehrs or annealers. Normal practice in the industry has been to contain the refractory block insulation in sheet metal enclosures having a metal thickness of about .08" to above .1". However, it has been determined that when utilizing such a conventional construction for a normal size door of about 1 sq. ft., heat is conducted along the sheet metal sidewalls from the hot inner surface of the enclosure, facing the operating area, to the outside surface of the enclosing housing at a rate approximately 4 times that conducted by the insulation. When a plurality of such conventional enclosures are laid up within a housing for a hot glass operation, undesirable temperature gradients result across the inner face of the various enclosures due to the heat loss by conduction outwardly along the side edges of the sheet metal enclosures.

The present invention provides an improved casing structure which minimize these temperature gradients while providing adequate protection against contamination of the glass by dusting or spalling of the refractory material. Briefly, my invention is directed to an improved enclosure cage for refractory insulating material wherein the inside face of the insulating block material may be covered with sheet metal in the conventional manner to resist abrasion. However, in place of the usual thickness of sheet metal customarily used to cover the edges or sidewalls of the refractory block, the present invention utilizes a thin metal foil to enclose sidewalls of the insulation against spalling and dusting, which foil is backed by an expanded metal cage that both protects the foil and retains the insulation with significant reduction in heat loss. That is, with this new construction, heat conducted to the outer surface by the metal cage is only one-half that conducted through the insulation.

It thus has been an object of this invention to provide an improved enclosure for refractory insulating material utilized to thermally insulate hot glass operations so as to eliminate the hazard of particles from such insulating material becoming dislodged and contaminating hot glass articles or rendering such articles unfit for their intended use.

A further object of the invention has been to provide a metallic cage or closure for refractory insulating material having an improved construction so as to minimize heat conduction along sidewalls of the enclosure from a front or inner hot surface to a backing or outer cold surface.

An additional object of the invention has been to provide an improved enclosure for refractory material utilized as thermal insulation, wherein uniform temperature distribution is obtained across the inner heat-exposed surface of the casing and local cold spots around the perimeter of the enclosed insulation, occasioned by known types of enclosures, are eliminated.

These and other objects of the invention will become apparent to those skilled in the art from the following disclosure and accompanying drawings in which:

FIG. 1 is a perspective view of an improved enclosure structure embodying the present invention.

FIG. 2 is a fragmental perspective view of a refractory insulating block within an enclosure representing a further embodiment of the present invention.

FIG. 3 is a plan view in section of an enclosed refractory block, such as shown in FIG. 2, but showing the foil in an exaggerated size relation with respect to the expanded metal.

FIG. 4 is a fragmental view illustrating the sidewall construction of my improved enclosure.

FIG. 5 is an enlarged fragmental cross-sectional view in elevation taken along line V—V of FIG. 4.

FIG. 6 is an elevational view of a plurality of enclosed refractory blocks showing the inner or front hot face of the enclosures as they might appear when surrounding a hot glass operation.

Referring now to the drawings and particularly FIG. 1, an improved closure construction 10 is shown which might be used for a corner block installation. That is, hidden faces 11, 12, and 13 would, in effect, be outside or backing surfaces when the block is placed in a corner position. Therefore, although longitudinal surfaces 14 and 15 may be positioned to function as forward or inner operating surfaces, in effect they both operate as sidewall surfaces since they extend outwardly from a forward heated area to an outer backing surface. End surface 16 operates as a usual sidewall surface, except for the fact that it connects with two outer or backing surfaces 12 and 13.

Referring now to FIG. 2, a preferred embodiment of an enclosure or cage 20 is shown enclosing a refractory insulating block 21. The enclosing cage 20 has an inner or forward face 22 of sheet metal which may have a side flange or skirt 23, and an outer or backing metal surface 24 which may be provided with a mounting flange 25. The four bounding sidewall surfaces 26, 27, 28 (and one not shown) of the closure 20, which connect the forward or inner surface 22 and the outer or backing surface 24, are covered or enclosed with a thin metal foil 29 and an expanded metal cage 30. The thin metal foil, which may be No. 304 stainless steel foil having a thickness of about .005", encloses the insulation against spalling and dusting, whereas the expanded metal cage functions as a structural support for the refractory material and a backing for the thin metal foil. The expanded metal cage may be welded or otherwise secured to flanges 23 and 25, and may be of any suitable material such as 18–20 gauge No. 304 stainless steel flattened expanded metal, or expanded Inconel metal having a thickness of approximately .070". Sidewalls 14, 15, and 16 of closure 10 are shown provided with foil 29 and expanded metal 30, similar to the sidewall surfaces of closure 20.

FIG. 6 represents the front or inner hot face of a plurality of stacked closures surrounding refractory insulating material adjacent a hot glass operation. It is usually desirable that a uniform temperature exist across the entire surface of the plurality of enclosures facing the hot glass operation, so that an even temperature distribution exists in the glass article in order to avoid undesirable stress and strain. However, since the sidewalls of the known type of enclosures are made of sheet metal, they function as heat sinks or heat conducting paths toward the outside of the housing. Accordingly, with such known structures uneven temperature distribution results across the entire hot face of the refractory enclosures. That is, edge walls e (see FIG. 6) of the plurality of sheet metal enclosures would provide undesirable localized cooling areas across the inner surface of the enclosed refractory due to the conduction of heat outwardly from the inner face along the sheet metal sidewalls of each enclosure. As previously mentioned, the heat is conducted to the outside surface along such sheet metal sidewalls at a rate approximately 4 times that at which heat is conducted by the refractory insulating material.

The advantages derived by the applicant's novel inventive concept can be better appreciated by reference to FIGS. 4 and 5. FIG. 4 is a fragmental plan view of a sidewall of an improved enclosure embodying my invention, showing the expanded metal cage 30 overlying the thin metal foil 29. As shown in the exploded cross-sectional view of FIG. 5, the metal foil is of such a relative thinness (about .005") that virtually negligible heat transfer is conducted therealong. The expanded metal cage 30, which may be from about 7 to 14 times as thick as the foil, also inhibits or minimizes heat flow along the sidewalls of the enclosing cage by requiring any heat loss to flow along a rather lengthy and tortuous path.

It has been found that the amount of heat flow along the expanded metal cage may be reduced by orienting the "diamond" shaped openings, formed by the expanded metal material, with their minor axes extending along the direction of thickness of the enclosing cage; that is, along the sidewall in a direction normal to the front wall and rear wall of the enclosing cage. This orientation is illustrated in FIG. 4 wherein line a—a, extending through the minor axes of the diamond shaped openings formed by the expanded metal grid along the sidewall of a closure, extends normal to a forward or inner hot face and a rearward or outer face of the closure. Accordingly, line a—a represents the direction which heat must flow from the inner hot surface to the outer cold surface of the enclosure. However, in order for heat to traverse the distance of line a—a through the expanded metal grid work along the sidewall, it is necessary for the heat to follow a tortuous path, shown by the solid arrows in FIG. 4, which is composed of six sides of the diamond shapes.

In contrast, heat transfer along the length of line b—b, which extends along the major axis of the diamond shapes and parallel to the front and rear surfaces of the enclosure, necessitates a path of only 4 sidewalls of the diamond shapes, as shown by the dash arrows, even though the lengths of lines a—a and b—b are substantially the same. It thus can be seen, that due to the extended path required for heat transfer along line a—a, the amount of heat transferred along a sidewall between the hot front face and cool rear face of my improved enclosure construction, is materially reduced. In fact, it has been found that when utilizing the improved closure construction of the present invention, the heat conducted from the inner surface along the sidewalls to the outer surface of the enclosure by the metal is only one-half that conducted through the refractory insulation.

It thus can be seen that the present invention obtains its objective of minimizing heat conduction by substituting a structure made of a thin metal foil and expanded metal cage for the customary thickness of sheet metal previously utilized to cover the sidewalls of refractory insulating blocks in conventional constructions. Both of the components utilized in the present sidewall structure have a much lower heat conductivity than the solid metal sheet previously utilized, so that the amount of heat conducted through the metal with the improved construction totals only about one-eighth of the heat conducted by the old sheet metal construction. This latter value of heat conduction is achieved by installing the expanded metal cage having a diamond shaped opening such that the direction of heat flow is across the short dimension of the diamond, since this orientation gives the maximum path length for heat flow.

Although the now preferred embodiments of the invention have been disclosed and described herein, it will be apparent to those skilled in the art that various changes and modifications may be made thereto without departing from the spirit and scope of the invention as defined in the appended claims.

I claim:

1. An improved closure structure having a front wall, a back wall, and a plurality of sidewalls connecting said front and back walls for enclosing refractory insulating material, wherein the improvement comprises at least one of said sidewalls being constructed of metal foil adjacent the refractory material, and expanded metal overlying said metal foil to provide a sidewall construction having reduced heat conductivity.

2. An improved enclosure as defined in claim 1 wherein said front wall is made of sheet material and said sidewalls the formed of thin metal foil within a cage of flattened expanded metal.

3. An improved enclosure as defined in claim 1 wherein said expanded metal has a plurality of diamond shaped openings, and said openings are oriented along the sidewall such that the short dimension of the diamond is substantially normal to the front and back wall of the enclosure so as to provide a maximum path length for heat flow from said front wall toward said back wall.

4. An improved metallic enclosure for protectively enclosing a block of refractory insulating material while it is subjected to elevated temperatures with minimum heat flow along sidewall portions of said enclosure between a normally hot forward face and a cooler rearward face thereof wherein improved sidewall construction having reduced heat conductivity comprises, sidewall portions extending between said forward and rearward face being formed of metal foil adjacent the refractory block, and an expanded metal cage backing said metal foil.

5. An improved enclosure as defined in claim 4 wherein said forward face is formed of sheet metal to resist abrasion, and said sidewall faces are all formed of thin metal foil backed by expanded metal to reduce heat conduction from said forward face to said rearward face.

6. An improved enclosure as defined in claim 4 wherein both said foil and said expanded metal are made of stainless steel, and said expanded metal is from about 7 to 14 times as thick as said foil.

7. An improved enclosure as defined in claim 4 wherein said expanded metal has a plurality of diamond shaped openings, and such openings along said sidewall portions are oriented such that heat flow from the forward surface to the rearward surface of the enclosure is across the short dimension of the diamond so as to provide the maximum path length for such heat flow.

8. An improved enclosure as defined in claim 4 wherein thin metal foil encloses the sidewalls of the refractory block against dusting, and said thin metal foil is enclosed within an expanded metal cage which both protects the foil and retains the refractory block with minimum heat loss by providing an extended metallic heat conducting path along such sidewalls.

References Cited

UNITED STATES PATENTS

| | | | |
|---|---|---|---|
| 2,861,793 | 11/1958 | Roudabush | 52—596 |
| 3,100,677 | 8/1963 | Frank et al. | 52—232 |
| 3,213,533 | 10/1965 | Lynam et al. | 52—596 |

FRANK L. ABBOTT, *Primary Examiner.*

S. D. BURKE, *Assistant Examiner.*